United States Patent
Barnett et al.

(10) Patent No.: US 12,296,945 B2
(45) Date of Patent: May 13, 2025

(54) WINGLET AND WINGLET COVER ASSEMBLY

(71) Applicant: AIRBUS OPERATIONS LIMITED, Bristol (GB)

(72) Inventors: Thomas Barnett, Bristol (GB); Andrew Scaife, Bristol (GB); Lee Proudler, Bristol (GB); Richard Hewson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/102,469

(22) Filed: Jan. 27, 2023

(65) Prior Publication Data
US 2023/0166833 A1    Jun. 1, 2023

Related U.S. Application Data

(63) Continuation-in-part of application No. PCT/EP2021/069646, filed on Jul. 14, 2021.

(30) Foreign Application Priority Data

Jul. 27, 2020 (GB) ..................................... 2011587

(51) Int. Cl.
*B64C 23/06* (2006.01)
*B64C 3/18* (2006.01)

(52) U.S. Cl.
CPC ............ *B64C 23/069* (2017.05); *B64C 3/185* (2013.01); *B64C 3/187* (2013.01)

(58) Field of Classification Search
CPC ........................... B64C 23/065; B64C 23/069
See application file for complete search history.

(56) References Cited

U.S. PATENT DOCUMENTS

| 2,233,969 | A | * | 3/1941 | Woods | .................... B64C 3/187 244/123.8 |
| 6,280,279 | B1 | * | 8/2001 | Tanger | ................... A63H 27/02 446/88 |
| 7,681,835 | B2 | | 3/2010 | Simpson et al. | |

(Continued)

FOREIGN PATENT DOCUMENTS

| CN | 203306222 | | 11/2013 | |
| EP | 3248863 | A1 * | 11/2017 | ............... B64C 1/26 |

(Continued)

OTHER PUBLICATIONS

Combined Search and Examination Report for Application No. GB 2011587.9, Seven pages, dated Apr. 14, 2021.

(Continued)

*Primary Examiner* — Nicholas McFall
*Assistant Examiner* — Eric Acosta
(74) *Attorney, Agent, or Firm* — Nixon & Vanderhye P.C.

(57) ABSTRACT

A winglet is disclosed including first and second covers, a front spar, a rear spar, a rib, and a mid spar between the front spar and the rear spar. The rib and each spar are joined to the first cover and to the second cover. The mid spar has a length and the mid spar curves along all or part of its length. The length of the mid spar extends from an inboard end of the mid spar to an outboard end of the mid spar, and the rib wraps around the inboard or outboard end of the mid spar.

20 Claims, 13 Drawing Sheets

(56) References Cited

U.S. PATENT DOCUMENTS

| | | |
|---|---|---|
| 8,544,800 B2 | 10/2013 | Stuhr |
| 10,023,292 B2 | 7/2018 | Fong et al. |
| 2015/0203190 A1 | 7/2015 | Witte et al. |
| 2016/0031551 A1 | 2/2016 | Campbell, Jr. et al. |
| 2019/0329873 A1 | 10/2019 | Proudler et al. |

FOREIGN PATENT DOCUMENTS

| | | | |
|---|---|---|---|
| EP | 3 415 415 | 12/2018 | |
| EP | 3415415 A1 * | 12/2018 | ........... B64C 23/069 |
| GB | 2597522 | 2/2022 | |
| WO | 2014/170690 | 10/2014 | |
| WO | 2014/170693 | 10/2014 | |
| WO | 2017/151580 | 9/2017 | |
| WO | 2019/207089 | 10/2019 | |
| WO | 2022/023045 | 2/2022 | |

OTHER PUBLICATIONS

International Search Report for Application No. PCT/EP2021/069646, four pages, dated Sep. 29, 2021.
Written Opinion of the IDS for Application No. PCT/EP2021/069646, seven pages, dated Sep. 29, 2021.

* cited by examiner

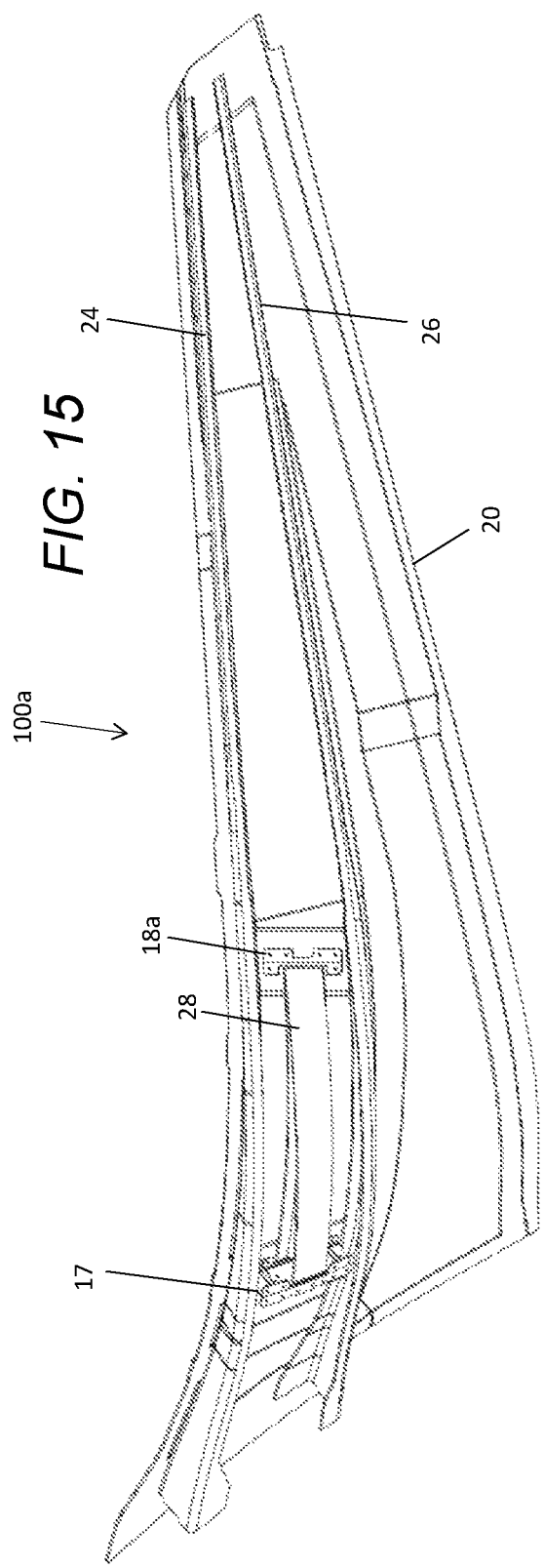

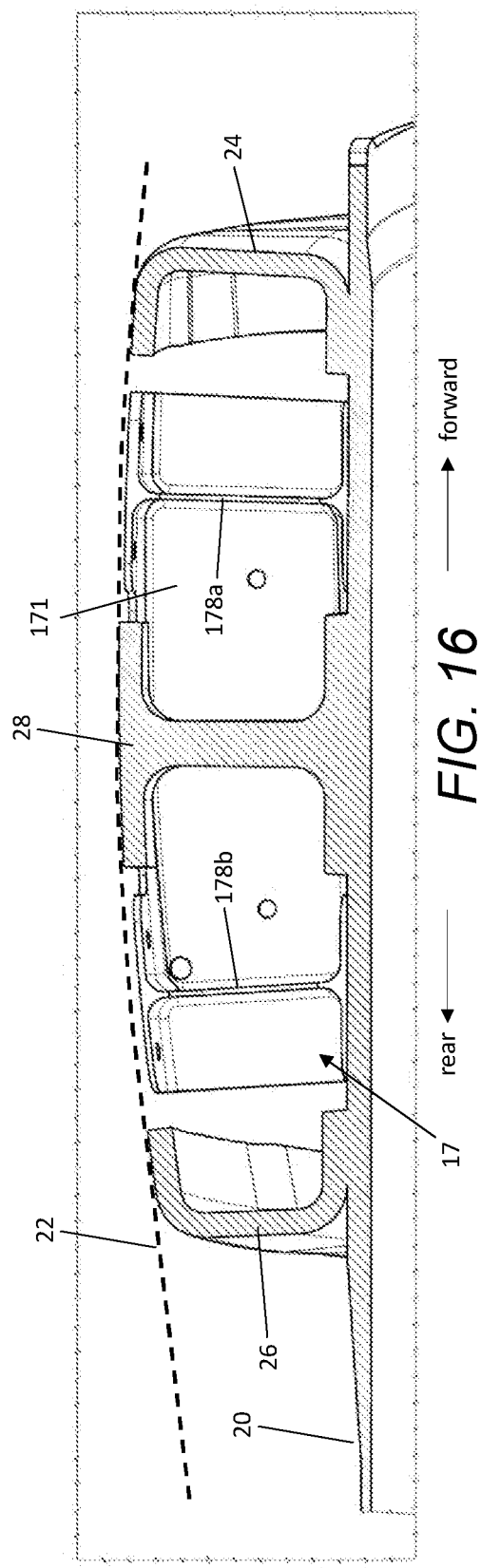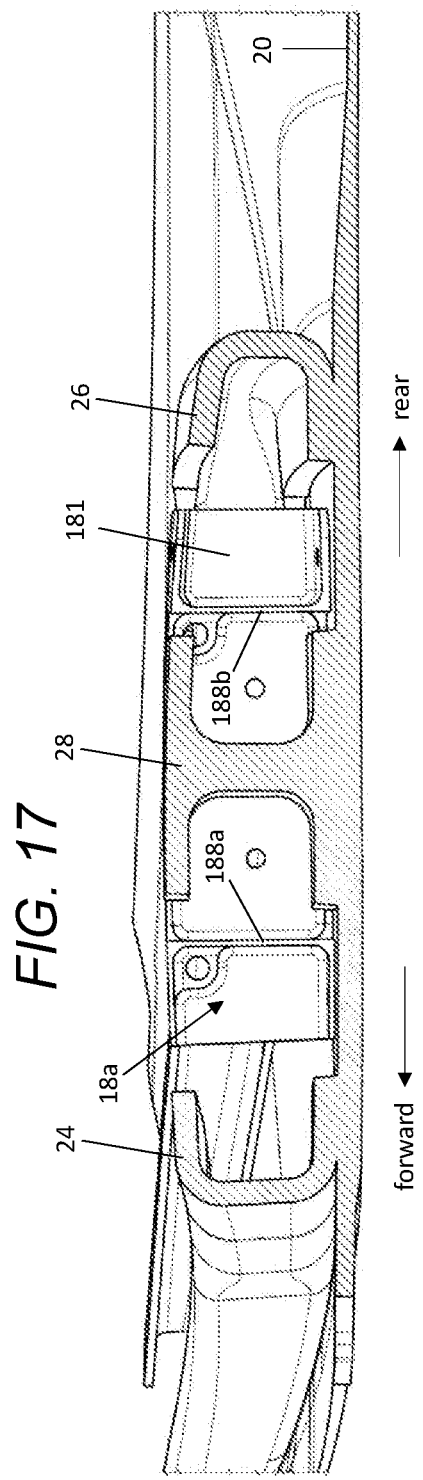

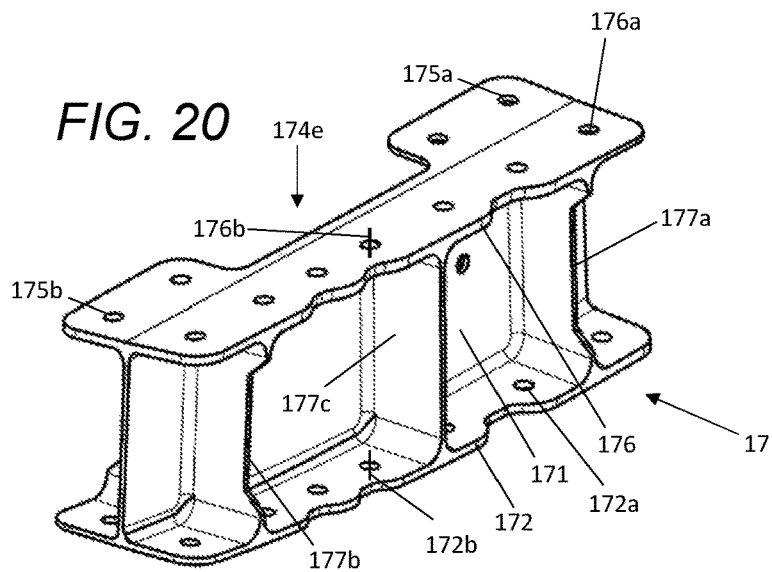
FIG. 20
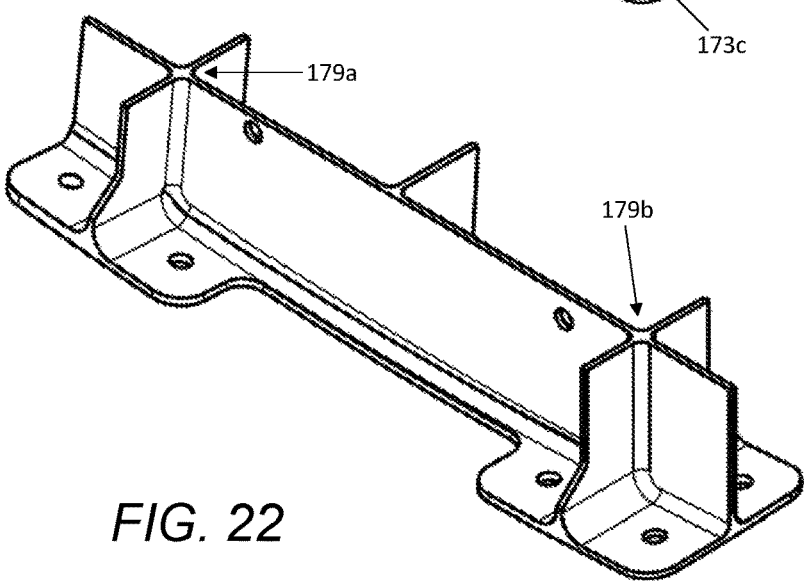
FIG. 21
FIG. 22

WINGLET AND WINGLET COVER ASSEMBLY

CROSS-REFERENCE TO RELATED APPLICATIONS

This application is a Continuation-in-Part application which claims priority from International Application Number PCT/EP2021/069646 filed Jul. 14, 2021, which claims priority from United Kingdom (GB) Patent Application 2011587.9, filed Jul. 27, 2020, the entire contents of each of which are hereby incorporated by reference.

FIELD OF THE INVENTION

The present invention relates to a winglet, a winglet cover assembly and a method of manufacturing a winglet cover assembly.

BACKGROUND OF THE INVENTION

US2019/0329873 discloses a winglet extending down from a lower side of a wing portion. The winglet has first and second outer walls, and two spars. Each of the spars has a C-shaped cross-sectional shape. In other embodiments, the cross-sectional shape of the or each spar may be circular, elliptical, polygonal or quadrilateral. The outer walls and the spars are formed as a unitary structure by resin transfer moulding.

WO2019/207089 discloses an upwardly curving winglet with a composite spar. The composite spar has a main body and a pair of spaced apart legs. Each leg has a C-shaped cross section, arranged so that the convex parts of the respective C-shapes face each other. The winglet also has a front spar with a C-shaped cross section. The spar caps of the front spar are directed forwards, away from the composite spar.

US2015/0203190 discloses a split winglet with an upper winglet and a lower winglet. Each winglet has a forward spar, an aft spar and a mid spar.

WO2014/170693 discloses a winglet with a tubular braided main spar. The closed tubular structure of the main spar enables the winglet to handle bending loads efficiently and means that transverse ribs are not required.

SUMMARY OF THE INVENTION

A first aspect of the invention provides a winglet comprising first and second covers, a front spar, a rear spar, a rib, and a mid spar between the front spar and the rear spar; wherein: the rib and each spar are joined to the first cover and to the second cover; the mid spar has a length and the mid spar curves along all or part of its length; the length of the mid spar extends from an inboard end of the mid spar to an outboard end of the mid spar; and the rib wraps around the inboard or outboard end of the mid spar.

A second aspect of the invention provides a winglet comprising first and second covers, a front spar, a rear spar, a rib, and a mid spar between the front spar and the rear spar; wherein: the rib and each spar are joined to the first cover and to the second cover; the mid spar has a length and the mid spar curves along all or part of its length; the length of the mid spar extends from an inboard end of the mid spar to an outboard end of the mid spar; and the rib comprises a recess which receives the inboard or outboard end of the mid spar.

Optionally the rib is not attached to the mid spar, except via the covers.

Optionally the rib is not attached to the front spar, except via the covers; and the rib is not attached to the rear spar, except via the covers.

Optionally the rib is not attached to the mid spar, except via the covers; the rib is not attached to the front spar, except via the covers; and the rib is not attached to the rear spar, except via the covers.

Optionally the rib comprises an inboard rib which wraps around the inboard end of the mid spar.

Optionally the inboard rib comprises: a first part positioned inboard of the inboard end of the mid spar; a second part positioned between the mid spar and the front spar and also positioned outboard of the inboard end of the mid spar; and a third part positioned between the mid spar and the rear spar and also positioned outboard of the inboard end of the mid spar.

Optionally the first part of the inboard rib comprises a first flange joined to the first cover and a second flange joined to the second cover.

Optionally the winglet further comprises a first fastener passing through the first flange and the first cover, and a second fastener passing through the second flange and the second cover.

Optionally the first and second fasteners are positioned in line with the inboard end of the mid spar.

Optionally the rib comprises an outboard rib which wraps around the outboard end of the mid spar.

Optionally the outboard rib comprises a first part positioned outboard of the outboard end of the mid spar, a second part positioned between the mid spar and the front spar and also positioned inboard of the outboard end of the mid spar, and a third part positioned between the mid spar and the rear spar and also positioned inboard of the outboard end of the mid spar.

Optionally the first part of the outboard rib comprises a first flange joined to the first cover and a second flange joined to the second cover.

Optionally the winglet further comprises a first fastener passing through the first flange and the first cover, and a second fastener passing through the second flange and the second cover.

Optionally the fasteners are positioned in line with the outboard end of the mid spar.

Optionally the second part is attached to the covers by fasteners, the third part is attached to the covers by fasteners, and the fasteners are positioned inboard of the outboard end of the mid spar.

Optionally the outboard rib comprises: a web; an inboard first flange which extends on an inboard side of the web and is joined to the first cover; an outboard first flange which extends on an outboard side of the web and is joined to the first cover; a cut-out in the outboard first flange; an inboard second flange which extends on the inboard side of the web and is joined to the second cover; an outboard second flange which extends on the outboard side of the web and is joined to the second cover; and a cut-out in the outboard second flange.

Optionally the rib comprises: a web; a first flange joined to the first cover; and a second flange joined to the second cover.

Optionally the web faces the end of the mid spar.

Optionally the rib further comprises one or more stiffeners, wherein each stiffener is coupled to the web and the first and second flanges.

Optionally the rib comprises an inboard rib which wraps around the inboard end of the mid spar, and the one or more stiffeners are positioned in line with the inboard end of the mid spar.

Optionally the rib comprises: a web; an inboard first flange which extends on an inboard side of the web and is joined to the first cover; an outboard first flange which extends on an outboard side of the web and is joined to the first cover; an inboard first flange which extends on the inboard side of the web and is joined to the first cover; and an outboard second flange which extends on the outboard side of the web and is joined to the second cover.

Optionally the rib further comprises an inboard stiffener which is coupled to the web, the inboard first flange and the inboard second flange; and an outboard stiffener which is coupled to the web, the outboard first flange and the outboard second flange.

Optionally the web and the stiffeners form a post with a cruciform profile.

Optionally the winglet comprises a root and a tip, the winglet extends in a spanwise direction from the root to the tip, the winglet further comprises a transition region with spanwise curvature, and the mid spar is located in the transition region.

A third aspect of the invention provides a winglet comprising first and second covers, a front spar, a rear spar, and a mid spar between the front spar and the rear spar; wherein each spar is joined to the first cover and to the second cover; the mid spar has an I-shaped cross-section comprising a mid spar web, a first pair of mid spar caps joining the mid spar to the first cover, and a second pair of mid spar caps joining the mid spar to the second cover; and the mid spar has a length and the mid spar curves along all or part of its length.

An aircraft comprising a winglet according to the first, second or third aspect of the invention is also provided.

The comments below apply to the first, second and third aspects of the invention.

Optionally the winglet comprises a root and a tip, the winglet extends in a spanwise direction from the root to the tip, the winglet further comprises a transition region with spanwise curvature, and the mid spar is located in the transition region.

Optionally the first cover and the mid spar are formed from fibre-reinforced composite material and the first cover is bonded to the first pair of mid spar caps; and/or the first cover and the front and rear spars are formed from fibre-reinforced composite material and the first cover is bonded to the first front spar cap and the first rear spar cap.

Optionally the front spar comprises a front spar web, a first front spar cap joining the front spar to the first cover, and a second front spar cap joining the front spar to the second cover; the rear spar comprises a rear spar web, a first rear spar cap joining the rear spar to the first cover, and a second rear spar cap joining the rear spar to the second cover; and the front spar caps and the rear spar caps are directed inwardly towards the mid spar.

Optionally each spar is bonded to the first cover, and each spar is joined to the second cover by fasteners.

A further aspect of the invention provides a winglet cover assembly comprising a cover and a spar, wherein the cover and the spar are formed from fibre-reinforced composite material; the spar has an I-shaped cross-section comprising a spar web, a first pair of spar caps joining the spar web to the cover, and a second pair of spar caps; the spar has a length and the spar curves along all or part of its length; and the cover is bonded to the first pair of spar caps.

Optionally the spar is a mid spar, and the assembly further comprises a front spar and a rear spar, wherein the mid spar is between the front spar and the rear spar: the front and rear spars are formed from fibre-reinforced composite material; the front spar comprises a front spar web, a first front spar cap joining the front spar to the cover, and a second front spar cap; the rear spar comprises a rear spar web, a first rear spar cap joining the rear spar to the cover, and a second rear spar cap; the front spar caps and the rear spar caps are directed inwardly towards the mid spar; and the cover is bonded to the first front spar cap and the first rear spar cap.

A further aspect of the invention provides a winglet cover assembly comprising: a cover, a front spar, a rear spar, a rib, and a mid spar between the front spar and the rear spar; wherein: the rib and each spar are joined to the cover; the mid spar has a length and the mid spar curves along all or part of its length; the length of the mid spar extends from an inboard end of the mid spar to an outboard end of the mid spar; and the rib wraps around the inboard or outboard end of the mid spar, and/or the rib comprises a recess which receives the inboard or outboard end of the mid spar.

The following comments apply to both the winglet of the first or second aspect, and the winglet cover assemblies of the further aspects.

Optionally the spar or mid spar follows a three dimensional curve along all or part of its length, and/or the spar or mid spar twists along all or part of its length.

Optionally each spar has a length, the length of the mid spar is less than the length of the front spar, and the length of the mid spar is less than the length of the rear spar.

Optionally each spar has a length, each spar curves with an average curvature along its length, the average curvature of the mid spar is more than the average curvature of the front spar, and the average curvature of the mid spar is more than the average curvature of the rear spar.

Optionally each spar cap extends away from a spar web to a respective edge of the spar cap.

A further aspect of the invention provides a method of manufacturing a winglet cover assembly, the winglet cover assembly comprising a cover and a spar, wherein the cover and the spar are formed from fibre-reinforced composite material, the method comprising: providing a spar, the spar having an I-shaped cross-section comprising a spar web, a first pair of spar caps and a second pair of spar caps, wherein the spar is formed from fibre-reinforced composite material, the spar has a length and the spar curves along all or part of its length; providing a cover, wherein the cover is formed from fibre-reinforced composite material; and bonding the cover to the first pair of spar caps.

Optionally the method further comprises providing one or more spar mandrels in the spar on a forward side of the spar web; and providing one or more spar mandrels in the spar on an aft side of the spar web, wherein the spar mandrels remain in the spar as the cover is bonded.

Optionally the spar is provided as a pair of back-to-back parts, and the pair of back-to-back parts are bonded to each other as the cover is bonded to the first pair of spar caps.

Optionally the spar is a mid spar, the spar caps are mid spar caps, and the method further comprises: providing a front spar comprising a front spar web, a first front spar cap and a second front spar cap, wherein the front spar is formed from fibre-reinforced composite material; positioning the front spar caps so that they are directed inwardly towards the mid spar; providing a rear spar comprising a rear spar web, a first rear spar cap and a second rear spar cap, wherein the rear spar is formed from fibre-reinforced composite material; positioning the rear spar caps so that they are directed inwardly towards the mid spar; and bonding the cover to the first front spar cap and the first rear spar cap.

Optionally the method further comprises providing one or more front spar mandrels in the front spar; and providing one or more rear spar mandrels in the rear spar, wherein the front and rear spar mandrels remain in the front and rear spars as the cover is bonded.

Optionally the method further comprises: fitting one or more cover mandrels between the mid spar and the front spar; and fitting one or more cover mandrels between the mid spar and the rear spar; wherein the cover mandrels remain fitted as the cover is bonded.

Optionally the method further comprises compressing, consolidating, shaping and/or moulding the winglet cover assembly with the mandrels.

Optionally the method further comprises removing the mandrels after the cover has been bonded.

Optionally the cover and spar(s) are bonded by co-curing.

Optionally the cover and spar(s) are provided by co-infusing preforms with a matrix material; and the cover and spar(s) are bonded by co-curing the matrix material.

BRIEF DESCRIPTION OF THE DRAWINGS

Embodiments of the invention will now be described with reference to the accompanying drawings, in which:

FIG. 15 shows a winglet cover assembly of an alternative winglet, including a pair of metal ribs;

FIG. 16 is a cross-sectional view in an inboard direction of a winglet including the winglet cover assembly of FIG. 15;

FIG. 17 is a cross-sectional view in an inboard direction of a winglet including the winglet cover assembly of FIG. 15, with the lower cover not shown;

FIGS. 20 and 21 are isometric views of the inboard rib;

FIG. 22 is an isometric view of the inboard rib, partly in section;

DETAILED DESCRIPTION OF EMBODIMENT(S)

Figure 1:
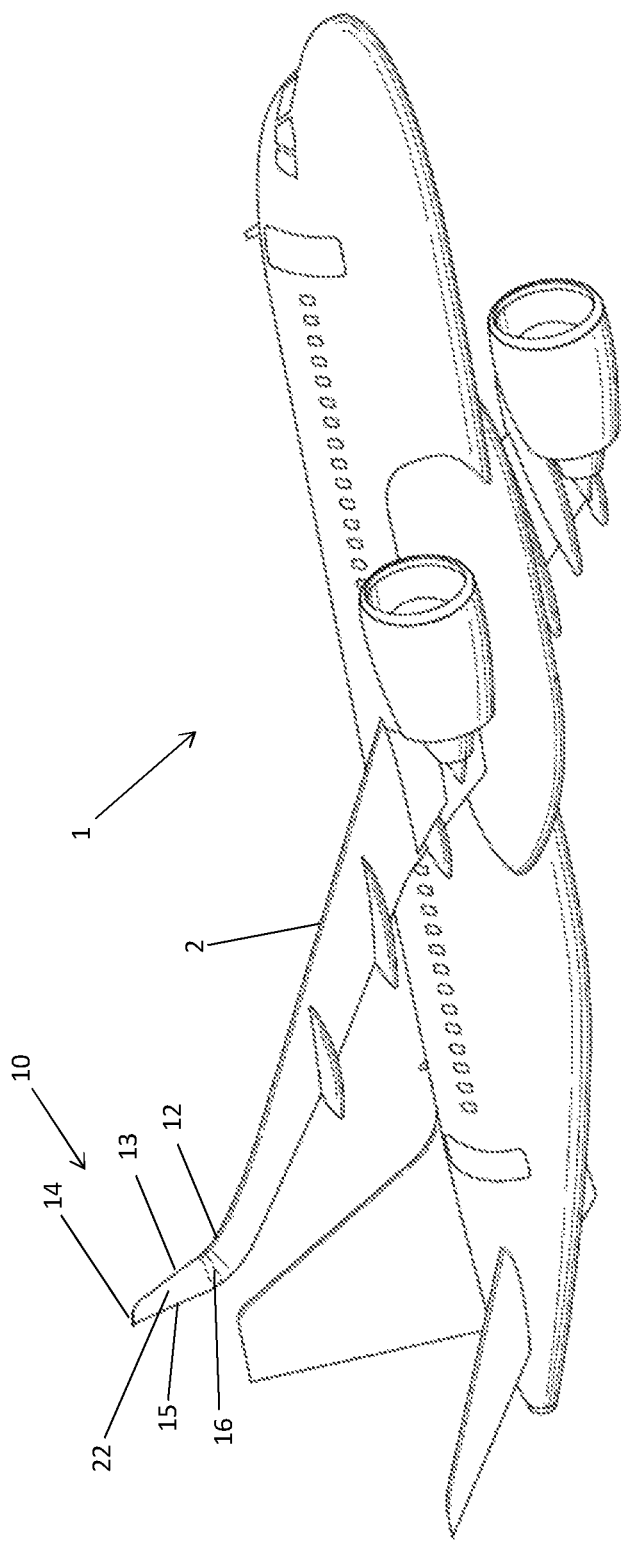
FIG. 1 shows an aircraft with a winglet.

An aircraft 1 shown in FIG. 1 has port and starboard wings extending from a fuselage. Only the starboard wing is shown in FIG. 1, and the port wing is a mirror image. The starboard wing comprises a main wing element 2, and a winglet 10 (or wing tip device). The winglet 10 has a root 12 attached to the tip of the main wing element 2, a tip 14, a leading edge 13, a trailing edge 15, and a curved transition region 16 between the root 12 and the tip 14.

Figure 1A:
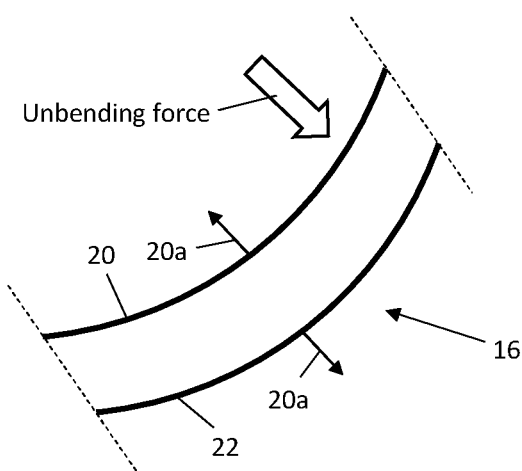
FIG. 1A shows out-of-plane forces caused by unbending of the winglet.
Figure 1B:
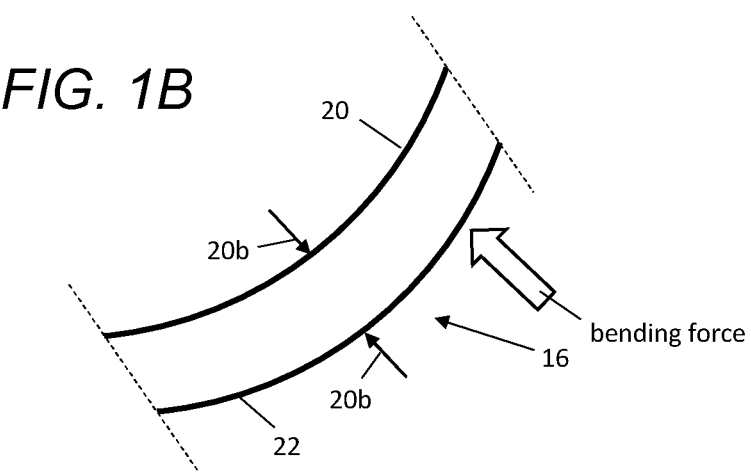
FIG. 1B shows out-of-plane forces caused by bending of the winglet.

FIGS. 1A and 1B are schematic views showing the curved transition region 16, which has a relatively high spanwise curvature.

During flight of the aircraft, aerodynamic effects can force the winglet 10 to "unbend" as shown in FIG. 1A. The unbending forces generate out-of-plane tensile forces 20a which tend to cause the covers 20, 22 to lift away from the spars. These out-of-plane tensile forces 20a are particularly strong in the highly curved transition region 16.

During the flight of the aircraft, aerodynamic effects can also force the winglet 10 to become more bent, as shown in FIG. 1B. The bending forces generate out-of-plane compressive forces 20b which tend to compress the winglet. These out-of-plane compressive forces 20b are also particularly strong in the highly curved transition region 16.

Figure 2:
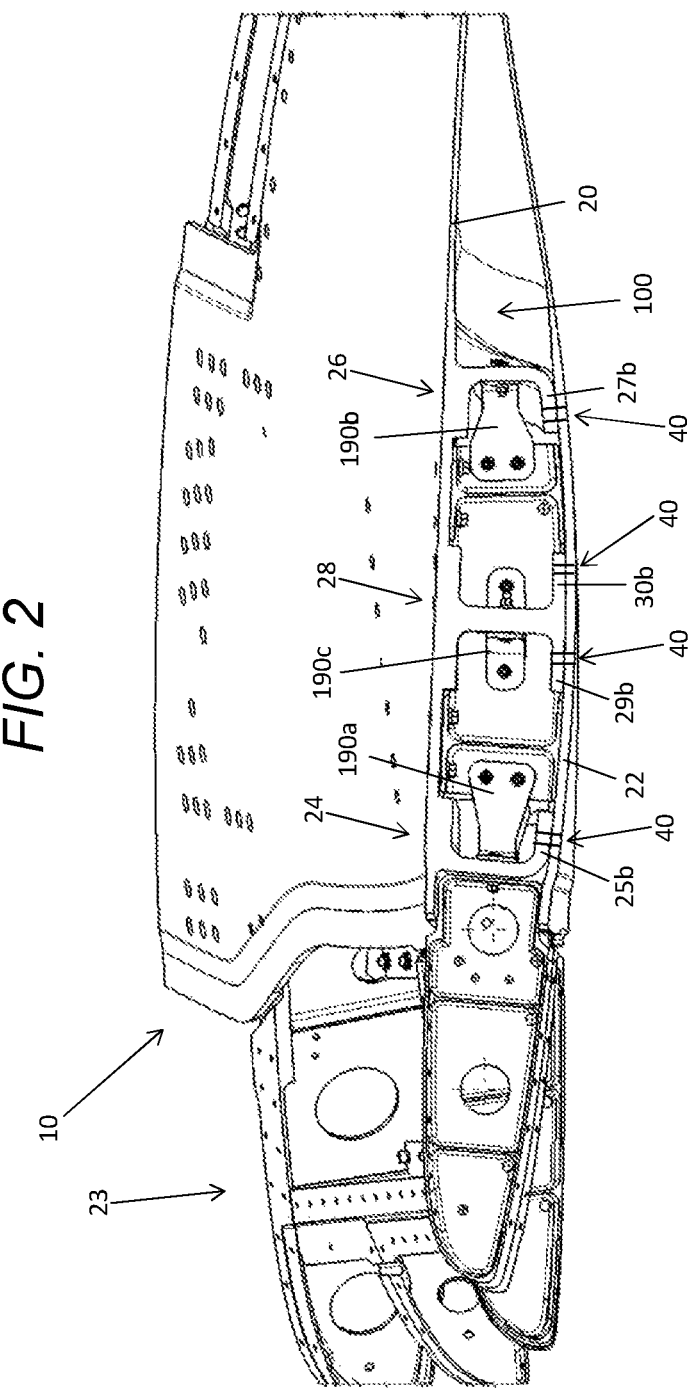
FIG. 2 is a chord-wise cross-section through a transition region of the winglet of FIG. 1.

FIG. 2 is a chord-wise cross-sectional view in an inboard direction through the curved transition region 16 of the winglet. The main elements of the winglet 10 are a winglet cover assembly 100, a second (lower) cover 22, and leading edge structure 23.

Figure 3:
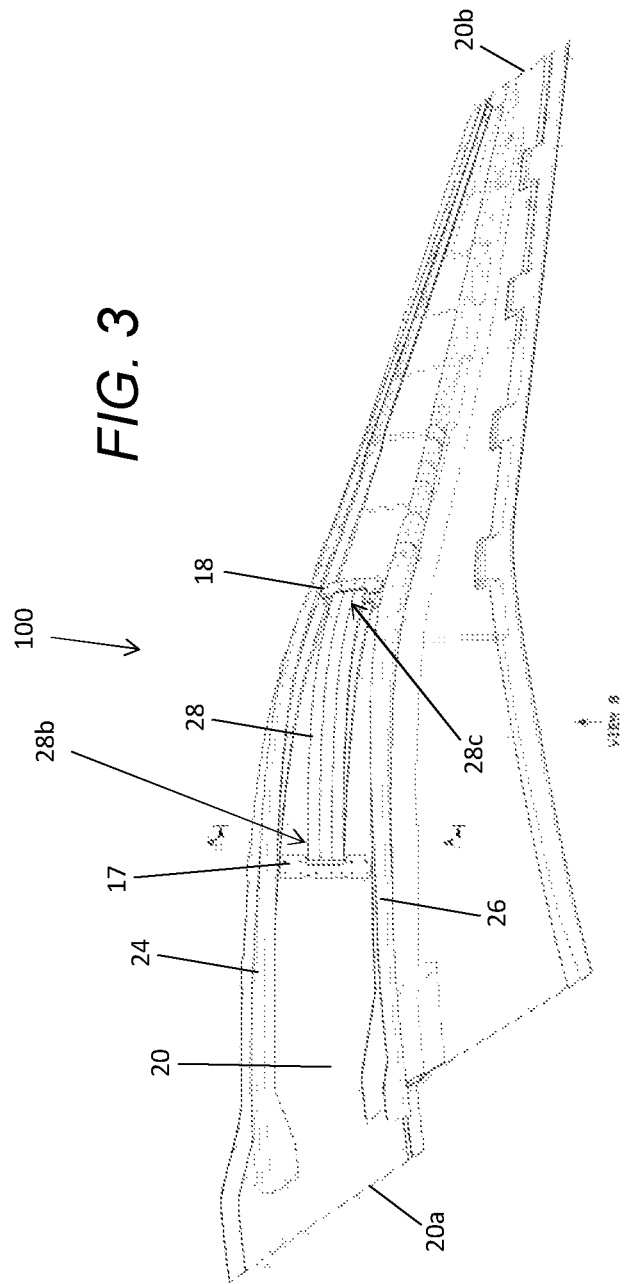
FIG. 3 shows a winglet cover assembly of the winglet, including a pair of metal ribs.
Figure 4:
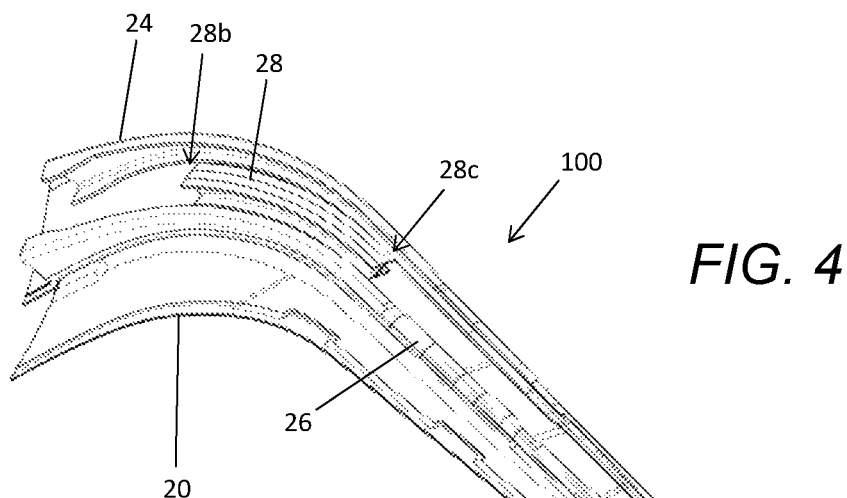
FIG. 4 is a view in direction B of the winglet cover assembly of FIG. 3, with the metal ribs omitted.
Figure 5:
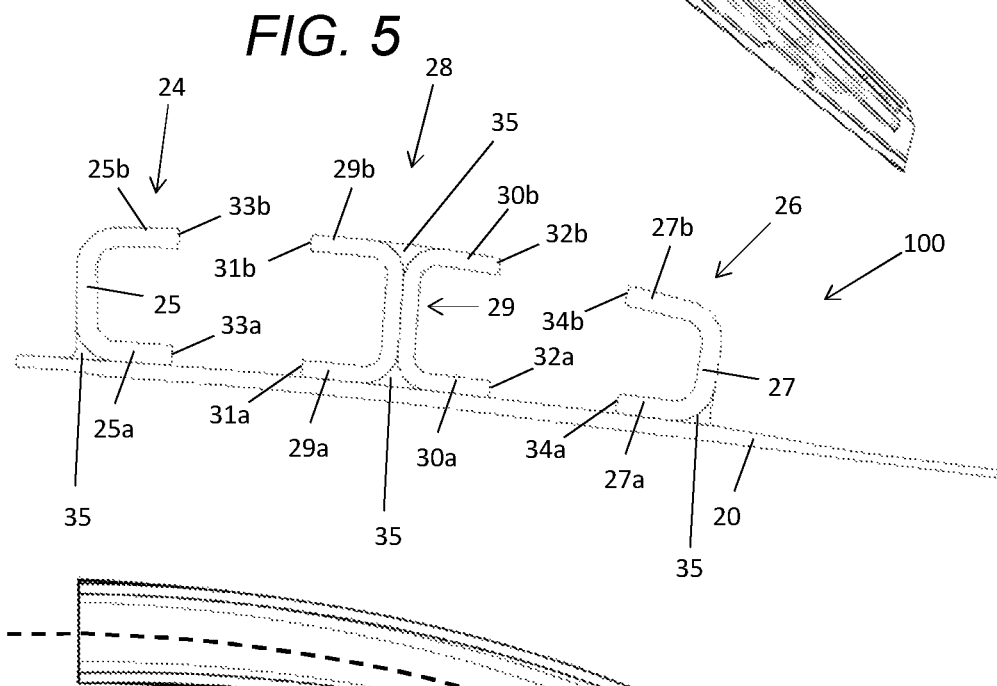
FIG. 5 is a section taken along a line A-A in FIG. 3.

The winglet cover assembly 100 is shown in FIGS. 3-5 in an inverted orientation. The winglet cover assembly 100 comprises a first (upper) cover 20, a front spar 24, a rear spar 26 and a mid spar 28 between the front spar and the rear spar. The cover 20 and spars 24, 26, 28 of the winglet cover assembly 100 form a unitary structure.

The mid spar 28 is provided to prevent the covers 20, 22 from becoming detached or damaged due to the out-of-plane forces 20a shown in FIG. 1A. Another function of the mid spar 28 is to control the overall stiffness of the winglet 10.

Figure 6:
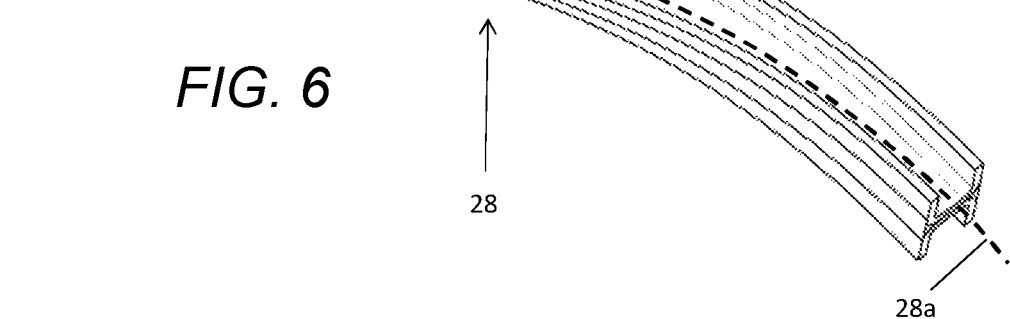
FIG. 6 shows the mid spar of the winglet.

The full length of the mid spar 28 is shown in FIG. 6. As shown in FIG. 3, the first cover 20 has an inboard edge 20a at the root 12 of the winglet, and an outboard edge 20b at the tip 14 of the winglet.

As shown in FIG. 4, the length of the mid spar 28 extends from an inboard end 28b of the mid spar to an outboard end 28c of the mid spar.

The first cover 20 provides the upper (low pressure) external skin of the winglet and the second cover 22 provides the lower (high pressure) external skin of the winglet.

The covers 20, 22 and the spars 24, 26, 28 are formed from fibre-reinforced composite material, such as carbon-fibre reinforced epoxy resin.

The winglet 10 has a metal inboard rib 17 and a metal outboard rib 18 at the inboard and outboard ends of the transition region 16. The ribs 17, 18 are not part of the composite winglet cover assembly 100. The ribs 17, 18 are shown in FIG. 3, but not shown in FIG. 4—which only shows the co-cured composite parts of the winglet cover assembly 100. The ribs 17, 18 are joined to the covers 20, 22 by fasteners. The winglet may have further transverse ribs, but these are not shown.

As shown in FIG. 3, when viewed in plan (for instance in a viewing direction at right angles to the upper cover 20 or at right angles to the lower cover 22), the inboard rib 17 wraps around both the forward and rear sides of the inboard end 28b of the mid spar, and the outboard rib 18 wraps around both the forward and rear sides of the outboard end 28c of the mid spar.

The outboard rib 18 can be seen in FIG. 2 which is a cross-section viewing in the outboard direction. As shown in FIG. 2, the outboard rib 18 is attached to the front spar 24 by a first cleat 190a, to the rear spar 26 by a second cleat 190b, and to the mid spar 28 by a third cleat 190c. These cleats 190a-c transfer shear forces from the outboard end 28c of the mid spar 28 into the front and rear spars via the outboard rib 18. The cleats 190a-c are not shown in FIG. 3, for ease of illustration.

The inboard rib 17 is attached to the front spar 24, the rear spar 26 and the mid spar 28 by similar cleats (not shown) which transfer shear forces from the inboard end 28c of the mid spar 28 into the front and rear spars via the inboard rib 17. These cleats are not shown in FIG. 3, for ease of illustration.

As shown in FIG. 5, the front spar 24 has an aft-directed C-shaped cross-section with a front spar web 25, a first front spar cap 25a joining the front spar to the first cover 20 and a second front spar cap 25b. As shown in FIG. 2, the second front spar cap 25b joins the front spar to the second cover 22.

The rear spar 26 comprises a rear spar web 27, a first rear spar cap 27a joining the rear spar to the first cover 20, and a second rear spar cap 27b. As shown in FIG. 2, the second rear spar cap 27b joins the rear spar to the second cover 22.

The front spar caps and the rear spar caps are directed inwardly towards the mid spar 28. Thus the front spar caps 25a, 25b extend aft from the front spar web 25 to respective edges 33a, 33b; and the rear spar caps 27a, 27b extend forward from the rear spar web 27 to respective edges 34a, 34b.

Each spar 22, 24, 26 is joined to the first cover 20 and to the second cover 22. More specifically, the first cover 20 is co-cured to the spars 22, 24, 26 and the second cover 22 is attached to the spars 22, 24, 26 by fasteners. A pair of fasteners 40 per spar cap are schematically shown in FIG. 2.

As shown in FIG. 5, the mid spar 28 has an I-shaped cross-section comprising a mid spar web 29, a first pair of mid spar caps 29a, 30a joining the mid spar web to the first cover 20, and a second pair of mid spar caps 29b, 30b. As shown in FIG. 2, the second pair of mid spar caps 29b, 30b join the mid spar to the second cover 22. Each mid spar cap extends away from the mid spar web 29 to a respective edge 31a, 31b, 32a, 32b.

The first pair of mid spar caps comprises a front first mid spar cap 29a with a front edge 31a and a rear first mid spar cap 30a with a rear edge 32a. The front first mid spar cap 29a extends forwards from the mid spar web 29 to the front edge 31a of the forward first mid spar cap. The rear first mid spar cap 30a extends aft from the mid spar web 29 to the rear edge 32a of the rear first mid spar cap. The first cover 20 is co-cured to the first pair of spar caps 29a, 30a.

Similarly the second pair of mid spar caps comprises a front second mid spar cap 29b with a front edge 31b and a rear second mid spar cap 30b with a rear edge 32b. The front second mid spar cap 29b extends forwards from the mid spar web 29 to the front edge 31b of the forward second mid spar cap. The rear second mid spar cap 30b extends aft from the mid spar web 29 to the rear edge 32b of the rear second mid spar cap. The second cover 22 is attached to the second pair of spar caps 29b, 30b by the fasteners 40.

Noodles 35 fill the gaps caused by the curved radii where the spar webs meet the spar caps.

Figure 8:
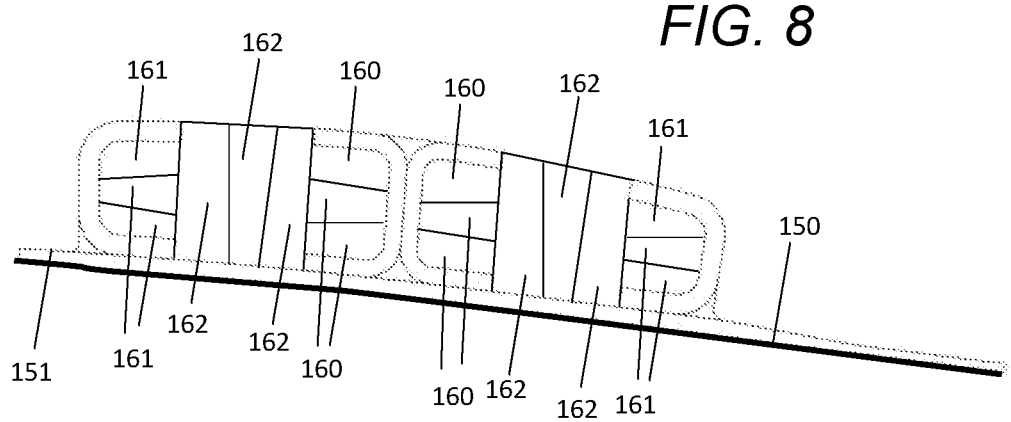
FIG. 8 shows a mandrel arrangement.
Figure 9:
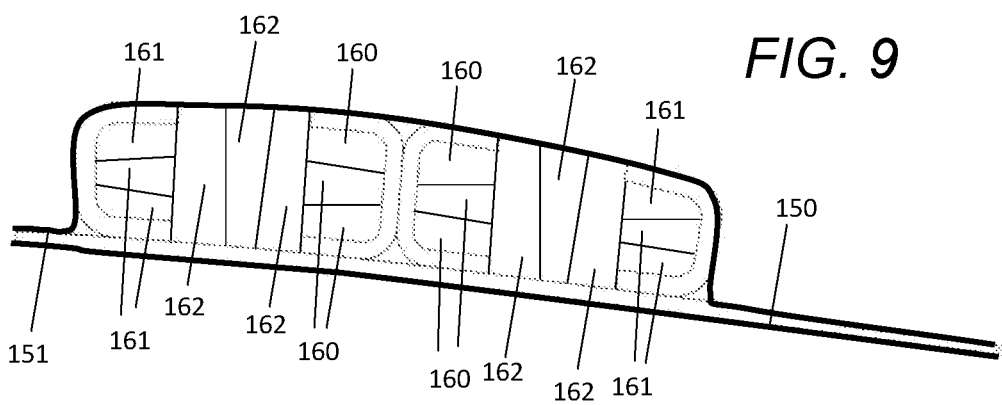
FIG. 9 shows the assembly of FIG. 8, with a second mould tool fitted.

The winglet cover assembly 100 is manufactured by resin transfer moulding (RTM) and then the second cover 22 and leading edge structure 23 are attached to the winglet cover assembly 100 by fasteners. A preferred method of manufacturing the winglet cover assembly 100 by resin transfer moulding is shown in FIGS. 7-9.

Figure 7:
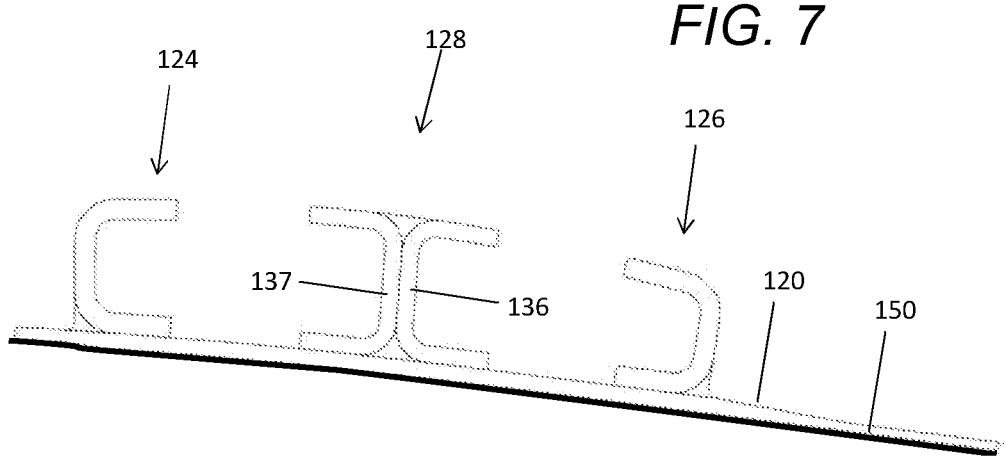
FIG. 7 shows a set of dry-fibre preforms on a mould tool.

The RTM method uses dry-fibre preforms 124, 126, 128 shown in FIG. 7 which, when infused and cured, provide the cover and spars of the winglet cover assembly 100 of FIGS. 3-5. The dry-fibre preforms are given the same reference number as the final composite parts, incremented by 100. Thus for example the front spar 24 is formed from a dry fibre preform 124.

In alternative embodiments, the winglet cover assembly 100 may be manufactured by same qualified resin transfer moulding (SQRTM), or any other manufacturing process which forms the winglet cover assembly 100 as a unitary composite structure. As will be understood by the skilled person, SQRTM is an RTM process in which each of the fibre preforms comprises prepreg (i.e. a body of "pre-impregnated" composite fibres in which a thermoset polymer matrix material is present).

A dry-fibre cover preform 120 is arranged on a first mould tool 150. A dry-fibre mid spar preform 128 is then placed on the dry-fibre cover preform 120. The dry-fibre mid spar preform 128 is formed from a pair of back-to-back C-shaped mid spar preforms. The pair of back-to-back C-shaped mid spar preforms comprise an aft C-shaped mid spar preform with a web 136; and a forward C-shaped mid spar preform with a web 137. The webs 136, 137 are placed in contact, back to back, with dry fibre noodles filling the gaps as shown.

Aluminium mid spar mandrels 160 are provided in the mid spar preforms as shown in FIG. 8, between the mid spar caps. These mid spar mandrels 160 may be inserted into the mid spar preforms before or after the mid spar preforms are placed on the cover preform 120. Alternatively, the mid spar preforms may be laid up onto the mid spar mandrels 160.

In this example, three mid spar mandrels 160 are provided in the mid spar on a forward side of the spar web; and three mid spar mandrels 160 are provided in the mid spar on an aft side of the mid spar web. In other embodiments, there may be a different number of mid spar mandrels on each side of the mid spar web, for instance one, two or more than three.

The mid spar mandrels 160 have a tapering wedge shape so that they can be removed laterally from the mid spar—that is, from the left or right direction as viewed in FIG. 8.

Next, front and rear spar preforms 124, 126 are arranged on the dry-fibre cover preform 120.

Aluminium spar mandrels 161 are provided in the front and rear spar preforms 124, 126 as shown in FIG. 8. The spar mandrels 161 may be inserted into the front and rear spar preforms 124, 126 before or after the front and rear spar preforms are placed on the cover preform 120. Alternatively, the front and rear spar preforms 124, 126 may be laid up onto the mid spar mandrels 161.

In this example three front spar mandrels 161 are provided in the front spar; and three rear spar mandrels 161 are provided in the rear spar. In other embodiments, there may be a different number of spar mandrels 161 per spar, for instance one, two or more than three.

The spar mandrels 161 have a tapering wedge shape so that they be removed laterally from the preforms 124, 126—that is, from the left or right as viewed in FIG. 8.

Aluminium cover mandrels 162 are also inserted into the gaps between the mid spar preform 128 and the front and rear spar preforms 124, 126. The cover mandrels 162 have a tapering wedge shape so that they can be inserted into the gaps from above as viewed in FIG. 8, and removed in reverse.

In this example three cover mandrels 162 are provided between each pair of spars. In other embodiments, there may be a different number of cover mandrels 162 between each pair of spars, for instance one, two or more than three.

A second mould tool 151 is then fitted as shown in FIG. 9, and liquid thermosetting epoxy resin is injected into the cavity between the mould tools 150, 151.

The dry fibre preforms 120, 124, 126, 128 are co-infused with the resin, and the assembly is heated so that the resin cures to co-cure the various parts to each other. That is, the first cover 20 is co-cured to the spars; and the back-to-back webs 126, 137 of the mid spar are co-cured to each other.

During the resin transfer moulding process, the mid spar web 29 is compressed, consolidated, shaped and/or moulded by the side faces of the mid spar mandrels 160.

Similarly, the cover preform 20, the first pair of mid spar caps 29a, 30a, the first front spar cap 25a and the first rear spar cap 27a are compressed, consolidated, shaped and/or moulded by the mould tool 150 and the bottom faces of the spar mandrels 160, 161 as they become co-infused and co-cured.

The upper faces of the spar mandrels 160, 161 and the second mould tool 151 also apply pressure to the second pair of mid spar caps 29b, 30b, the second front spar cap 25b and the second rear spar cap 27b during the resin transfer moulding process, so that they become compressed, consolidated, shaped and/or moulded.

The cover mandrels 162 and mould tool 150 also hold the cover 20 between them during the resin transfer moulding process. Thus the cover 20 is compressed, consolidated, shaped and/or moulded by the bottom faces of the cover mandrels 162 and the mould tool 150 to accurately control the thickness of the external aerodynamic profile of the cover 20.

After the cover assembly 100 has fully cured, the mould tool 151 is removed, the cover mandrels 162 are removed from above, then the spar mandrels 160, 161 are removed from above through the gaps previously occupied by the mandrels cover 162.

In other embodiments, the mandrels 160, 161, 162 may not be removed.

In this example, the cover assembly 100 is manufactured by resin transfer moulding from a set of dry-fibre preforms. Alternatively the cover preform, mid spar preform, front spar preform and rear spar preform may be provided as pre-impregnated (prepreg) fibre preforms, and the prepreg fibre preforms joined together by co-curing or co-bonding. In this case, only a single mould tool may be required, rather than two mould tools 150, 151.

In the embodiments above, the mid spar 28 is located only in the highly curved transition region 16. In other embodiments, the mid spar may extend from the transition region into the less curved inboard region of the winglet and/or into the less curved outboard region of the winglet.

As shown in FIG. 6, the mid spar 28 has a complex geometry, bending vertically upwards, bending horizontally aft, and also twisting along its length. This complex geometry would make it difficult or impossible to insert or remove the mid spar mandrels 160 lengthwise (from either end of the mid spar 28). Further mandrels (not shown) are also fitted between the front and rear spars for the resin transfer moulding process, inboard and outboard of the mid spar 28, but these further mandrels are more easy to remove since they require less curvature, and the gap between the front and rear spars is much wider than the gaps between the mid spar 28 and the front and rear spars.

As can be seen in FIGS. 4 and 6, the mid spar 28 has a length, and the mid spar 28 curves along all or part of its length. In this case the mid spar 28 curves along most of its length.

In the example of FIG. 6, the mid spar 28 has a centre line 28a which follows a three dimensional curve (a curve which does not lie in a single plane) along all or part of its length, and the mid spar also twists along all or part of its length. In other embodiments, the mid spar may be neither bent nor twisted, and/or it may follow a planar (2D) curve.

In the example of FIG. 6, the mid spar 28 curves vertically upwardly along all or part of its length. In other embodiments, the mid spar may curve vertically downwardly along all or part of its length (for instance in the case of a downwardly directed winglet). Optionally the mid spar may also curve horizontally, for instance in the case of a raked winglet.

Each spar 24, 26, 28 bends with an average curvature along its length. In the examples above, the mid spar 28 is highly curved in comparison to the front and rear spars. Specifically, each spar has a length, each spar curves with an average curvature along its length, the average curvature of the mid spar 28 is more than the average curvature of the front spar 24, and the average curvature of the mid spar is more than the average curvature of the rear spar 26. In other embodiments, the mid spar may be less curved than the front and/or rear spar.

Each spar 24, 26, 28 has a length which can be seen in FIGS. 3 and 4. The length of the mid spar 28 is less than the length of the front spar 24, which extends along almost the full length of the cover assembly 100. The length of the mid spar 28 is also less than the length of the rear spar 26, which extends along almost the full length of the cover assembly 100. This provides a weight saving because the mid spar 28 is only needed in the highly loaded transition region 16. For example the length of the mid spar 28 may be less than half the length of the front spar 24 and/or less than the half the length of the rear spar 26. In other embodiments, the mid spar may be as long as the front spar and/or as long as the rear spar.

The centre line 28a of the mid spar curves along all or part of its length. In this example the centre line 28a of the mid spar 28 is highly curved in order to follow the geometry of the highly curved transition region 16. By way of example, the minimum or average radius of curvature of the centre line 28a of the mid spar 28 may be less than 4 m, or less than 3 m, or less than 2 m.

The length of the mid spar 28 may be less than 1 m, for example in the range of 0.5-1 m. Optionally the minimum or average radius of curvature of the centre line 28a of the mid spar 28 is less than 400% of its length, less than 300% of its length, or less than 200% of its length.

Figure 10:
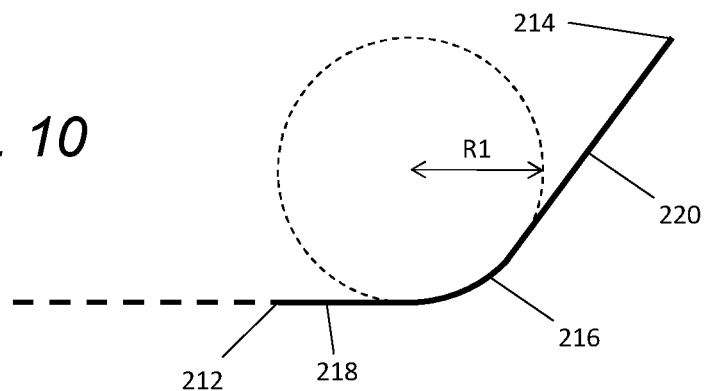
FIG. 10 shows a blended winglet.
Figure 11:
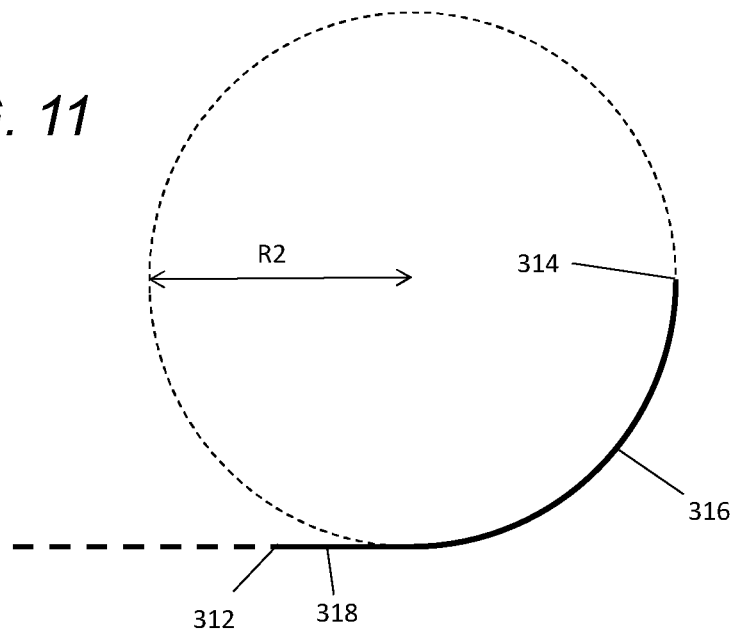
FIG. 11 shows a winglet with a transition region extending to the tip of the winglet.
Figure 12:
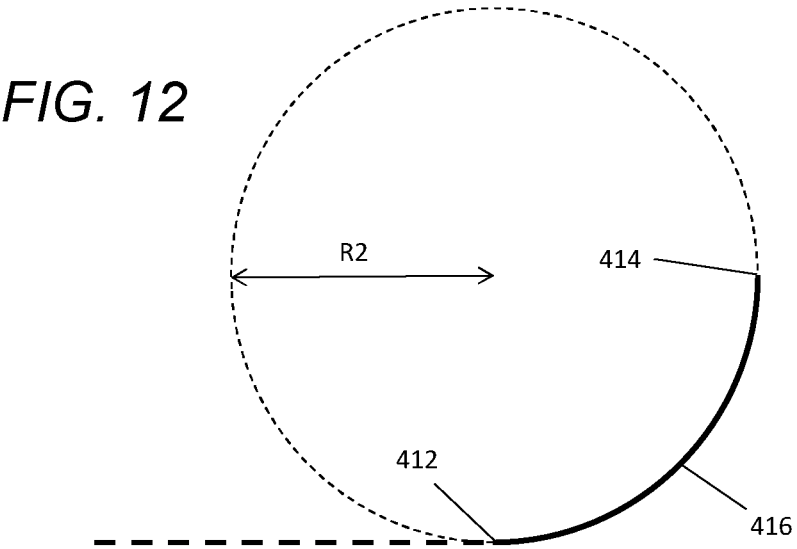
FIG. 12 shows a winglet with a transition region which extends along a full length of the winglet.

FIGS. 10-12 are schematic view of alternative winglets which can be fitted with the spar arrangement described above.

FIG. 10 shows a blended winglet similar to the winglet 10 but with a simpler geometry. The winglet comprises a root 212, a tip 214 and an upwardly curved transition region 216 between the root and the tip. The tip of the main wing (to which the root 212 of the winglet 200 is attached) is shown in dashed lines. The winglet 200 also has a less curved (or un-curved) inboard part 218 between the root 212 and the transition region 216; and a less curved (or un-curved) outboard part 220 between the transition region 216 and the tip 214. The inboard part 218 and the outboard part 220 have little or no spanwise curvature. Typically a mid spar only needs to be provided in the transition region 216, although optionally it may extend into the inboard part 218 and/or the outboard part 220.

FIG. 11 shows a winglet comprising a root 312, a tip 314 and an upwardly curved transition region 316 between the root and the tip. The winglet also has a less curved (or un-curved) inboard part 318 between the root 312 and the transition region 316. Unlike the winglet of FIG. 10, the curved transition region 316 extends all the way to the tip 314. The inboard part 318 has little or no spanwise curvature. Typically a mid spar only needs to be provided in the transition region 316, although optionally it may extend into the inboard part 318.

FIG. 12 shows a winglet comprising a root 412, a tip 414 and an upwardly curved transition region 416 between the root and the tip. Unlike the winglets of FIGS. 10 and 11, the curved transition region 416 extends all the way from the root 412 to the tip 414. Thus in this case the mid spar may need to be as long as both the front and rear spars, extending almost the full length of the winglet.

A mid spar is most beneficial in a blended winglet of the kind shown in FIG. 10, since the radius R1 of spanwise curvature in the transition region 216 is relatively low, and much lower than the radius R2 in the case of FIGS. 11 and 12.

By way of example, the minimum or average radius of spanwise curvature in the transition region 16 of the winglet 10 of FIG. 1 may be in the range of 1 m to 3 m, which may be about 25%-75% of the spanwise length of the winglet from the winglet root to the winglet tip.

Optionally the minimum or average radius of spanwise curvature of the winglet in the transition region 16, 216, 316, 416 of the winglet is less than 4 m or less than 3 m or less than 2 m.

The winglet comprises a root 12, 212, 312, 412 and a tip 14, 214, 314, 414 and the winglet has a spanwise length from the root to the tip, which may be of the order of 4 m. Optionally the minimum or average radius of spanwise curvature of the winglet in the transition region 16, 216, 316, 416 of the winglet is less than the spanwise length of the winglet, or less than 75% of the spanwise length of the winglet, or less than 50% of the spanwise length of the winglet.

FIG. 15 shows a winglet cover assembly 100a which is similar to the winglet cover assembly 100 shown in FIG. 3, but with a slightly modified outboard rib 18a. FIG. 16 is a cross-sectional view looking in the inboard direction, showing a winglet incorporating the winglet cover assembly 100a. The second cover 22 of the fully assembled winglet is indicated schematically by a dashed line in FIG. 16. FIG. 17 is a cross-sectional view looking in the outboard direction, showing the outboard rib 18a, but with the second cover 22 not shown. Identical features are given the same reference number as in the embodiment of FIG. 2.

Figure 18:
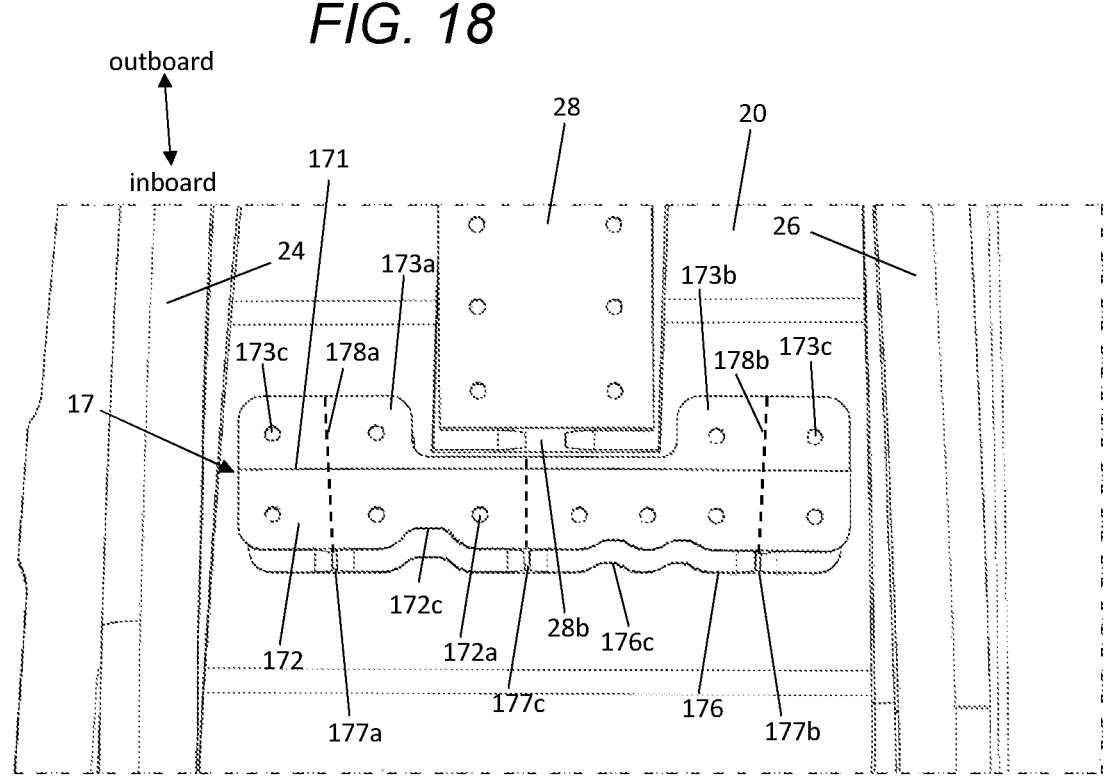
FIG. 18 is a view showing the inboard rib and the inboard end of the mid spar.

FIG. 18 shows the inboard end 28b of the mid spar 28, and the inboard rib 17, in detail. The inboard rib 17 comprises a planar web 171 which is not visible in FIG. 18 but can be seen in FIGS. 20 and 21. Note that FIG. 18 is a view of the underside of the inboard rib, and FIGS. 20 and 21 show the inboard rib 17 in a different orientation so the underside of the inboard rib 17 is at the bottom.

An inboard first flange 176 extends on an inboard side of the web 171 and is joined to the first cover 20 by fasteners which pass through a row of seven fastener holes 176a shown in FIG. 20. A central one of the fasteners is also indicated schematically at 176b in FIG. 20.

Outboard first flanges 174a, 174b extend on an outboard side of the web 171 and are joined to the first cover 20 by fasteners (not shown) which pass through fastener holes 174c, 175b (two per flange).

A recess 174e (indicated in FIG. 20) between the outboard first flanges 174a, 174b receives the inboard end 28b of the mid spar. The recess 174e enables the "wrap-around" geometry of the inboard rib 17 shown in FIG. 18.

An inboard second flange 172 extends on an inboard side of the web 171 and is joined to the second cover 22 by fasteners which pass through a row of seven fastener holes 172a. A central one of the fasteners is indicated at 172b in FIG. 20.

The edges of the inboard flanges 176, 172 are each formed with three small cut-outs 176c, 172c for weight-saving purposes.

Outboard second flanges 173a, 173b extend on an outboard side of the web 171 and are joined to the second cover 22 by fasteners (not shown) which pass through fastener holes 173c.

A recess 174f (indicated in FIG. 21) between the outboard second flanges 175a, 175b receives the inboard end 28b of the mid spar. Thus the recess 174f enables the "wrap-around" geometry of the lower part of the inboard rib 17.

The inboard rib 17 further comprises five vertically-oriented stiffeners: three inboard stiffeners 177a-c on the inboard side of the web 171 and two outboard stiffeners 178a, 178b on the outboard side of the web 171. The inboard stiffeners 177a-c can be seen in FIG. 20 and the outboard stiffeners 178a, 178b can be seen in FIG. 21. These stiffeners prevent buckling of the web 171 of the inboard rib 17 by the out-of-plane compressive forces 20b shown in FIG. 1B.

Each inboard stiffener 177a-c is coupled to the web 171 via a stiffener/web junction and coupled to the inboard flanges 176, 172 via respective stiffener/flange junctions.

Similarly each outboard stiffener 178a, 178b is coupled to the web 171 via a stiffener/web junction and coupled to the outboard flanges 174a, 174b, 173a, 173b via respective stiffener/flange junctions.

The stiffeners 177a, 178a on the forward side of the inboard rib 17 are at the same chordwise position so that the web 171 and the stiffeners 177a, 178a form a post 179a with a cruciform profile. FIG. 22 is a view of the inboard rib 17, partly in section, which clearly shows the post 179a.

Similarly the stiffeners 177b, 178b on the rear side of the inboard rib 17 are at the same chordwise position so that the web 171 and the stiffeners 177b, 178b form a post 179b with a cruciform profile. This post 179a is shown in FIG. 22.

Such cruciform profiles provide efficient and balanced stiffening structures positioned close to the corners of the mid-spar 28.

In an alternative embodiment, the stiffeners 177b, 178b on the rear side of the inboard rib 17 may be offset so they are not at the same chordwise position. This provides a less balanced profile than the cruciform post 179b but may be beneficial in other embodiments.

Similarly, the stiffeners 177a, 178a on the front side of the inboard rib 17 may be offset so they are not at the same chordwise position. This provides a less balanced profile than the cruciform post 179a but may be beneficial in other embodiments.

As shown in FIG. 3, and also in FIG. 18, when viewed in plan (for instance in a viewing direction at right angles to the upper cover 20 or at right angles to the lower cover 22), the inboard rib 17 wraps around both the forward and rear sides of the inboard end 28*a* of the mid spar.

In this example, the inboard rib 17 comprises a first part (the web 171, the inboard flanges 172, 176 and the inboard stiffeners 177*a*-*c*) positioned inboard of the inboard end 28*a* of the mid spar, a second part (the outboard flanges 174*a*, 173*a* on the front side of the inboard rib 17 and the outboard stiffener 178*a* on the front side of the inboard rib 17) positioned between the mid spar 28 and the front spar 24 and also positioned outboard of the inboard end 28*b* of the mid spar, and a third part (the outboard flanges 174*b*, 173*b* on the rear side of the inboard rib 17 and the outboard stiffener 178*b* on the rear side of the inboard rib 17) positioned between the mid spar 28 and the rear spar 26 and also positioned outboard of the inboard end 28*b* of the mid spar.

The mid spar 28 stops short of the web 171 of the inboard rib without passing through the web 171, so the web 171 faces the inboard end 28*b* of the mid spar.

Beneficially, the central stiffener 177*c* is positioned in line with the inboard end 28*a* of the mid spar, unlike the other stiffeners which are offset (fore or aft) from the inboard end 28*a* of the mid spar.

Beneficially, at least two of the fastener holes 172*a*, 176*a* are positioned in line with the inboard end 28*a* of the mid spar, unlike the other fastener holes which are offset (fore or aft) from the inboard end 28*a* of the mid spar.

In the embodiment of FIG. 2, the inboard rib 17 is attached to the front spar 24 by a first cleat, to the rear spar 26 by a second cleat, and to the mid spar 28 by a third cleat. These cleats transfer shear forces from the ends of the mid spar 28 into the front and rear spars via the inboard rib 17.

In the embodiment of FIG. 16 on the other hand, the inboard rib 17 is not attached to the mid spar 28, the front spar 24 or the rear spar 26, except via the covers 20, 22. In other words, the cleats are omitted in the final assembled winglet shown in FIG. 16. This reduces parts count and significantly simplifies the assembly processes and procedures.

The outboard rib 18 in FIG. 3 has a similar structure to the inboard rib 17, except without equivalents to the cut-outs 172*c*, 176*c* and with fewer fastener holes.

As shown in FIG. 3, the outboard rib 18 wraps around both the forward and rear sides of the outboard end 28*c* of the mid spar 28.

FIG. 15 shows an alternative outboard rib 18*a* which is shown in further detail in FIGS. 19 and 23-25.

Figure 19:
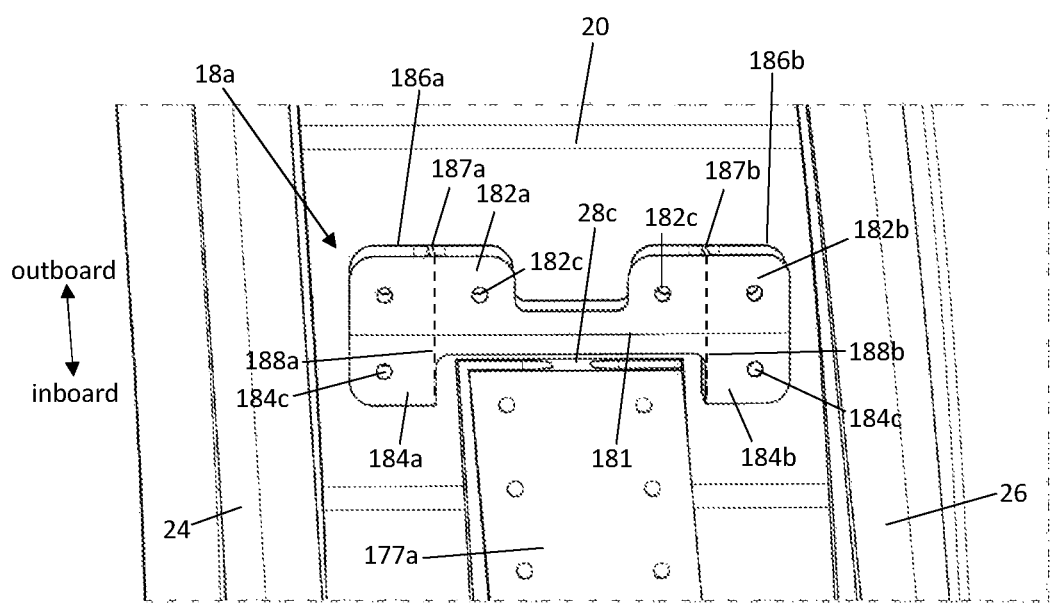
FIG. 19 is a view showing the outboard rib and the outboard end of the mid spar.

FIG. 19 shows the lower side of the outboard end 28*c* of the mid spar, and the outboard rib 18*a*, in detail. The outboard rib 18*a* comprises a planar web 181 which is not visible in FIG. 19 but shown in FIGS. 23-25.

Figure 23:
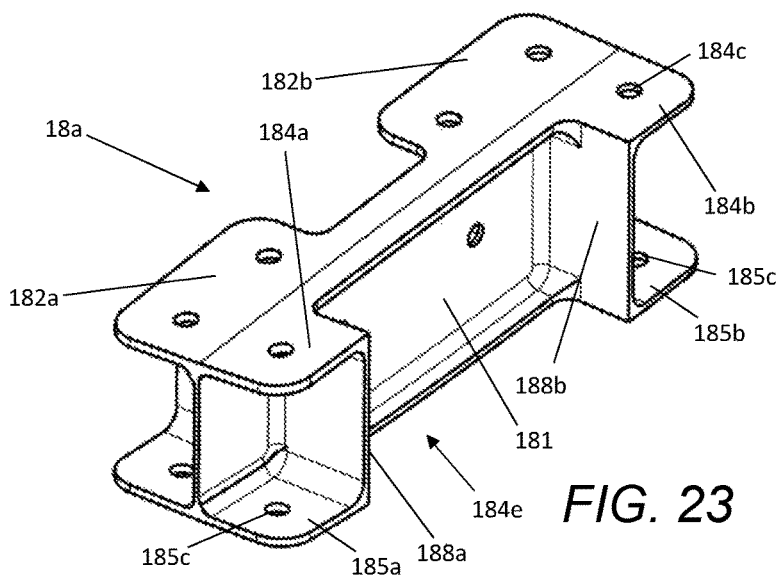
FIGS. 23 and 24 are isometric views of the outboard rib.
Figure 24:
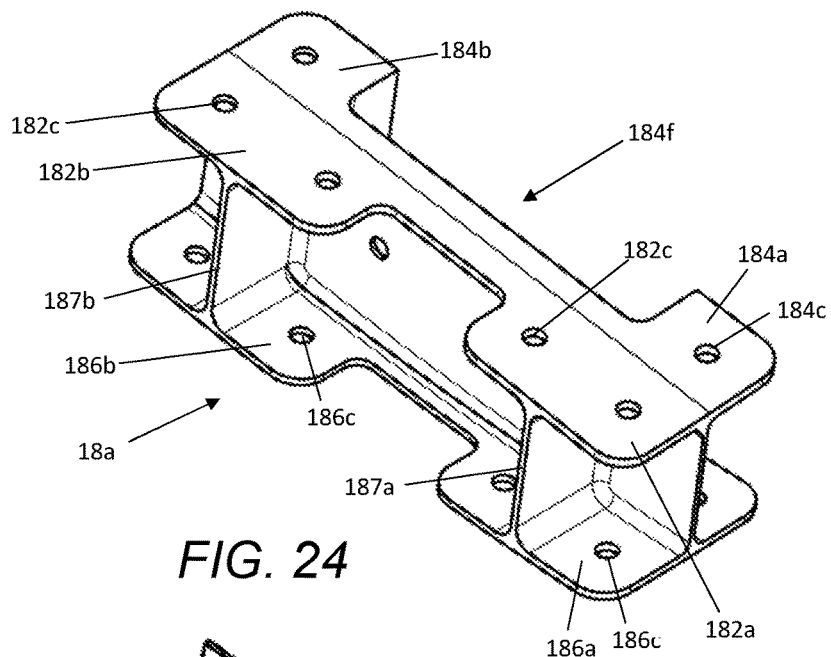
Figure 25:
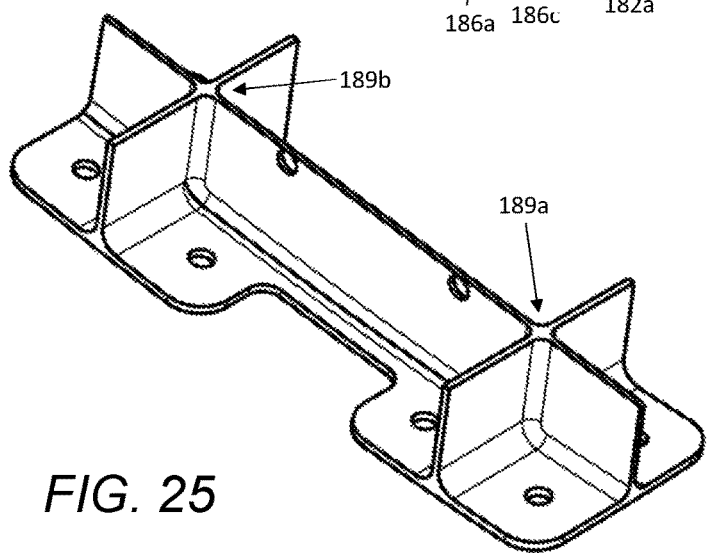
FIG. 25 is an isometric view of the outboard rib, partly in section.

Note that FIG. 19 is a view of the underside of the outboard rib 18*a*, and FIGS. 23-25 also show the inboard rib 17 with the underside of the inboard rib 17 at the top.

Outboard first flanges 186*a*, 186*b* extend on an outboard side of the web 181 and are joined to the first cover 20 by fasteners which pass through fastener holes 186*c* shown in FIG. 24. A large cut-out between the outboard first flanges 186*a*, 186*b* saves weight and results in the omission of a fastener hole (compared with the outboard rib 18 of FIG. 3).

Inboard first flanges 185*a*, 185*b* extend on an inboard side of the web 181 and are joined to the first cover 20 by fasteners (not shown) which pass through fastener holes 185*c*.

A recess 184*e* (indicated in FIG. 23) between the inboard first flanges 185*a*, 185*b* receives the outboard end 28*c* of the mid spar. Thus the recess 184*e* enables the "wrap-around" geometry of the upper part of the outboard rib 18*a*.

Outboard second flanges 182*a*, 182*b* extend on an outboard side of the web 181 and are joined to the second cover 22 by fasteners (not shown) which pass through fastener holes 182*c*.

Inboard second flanges 184*a*, 184*b* extend on an inboard side of the web 181 and are joined to the second cover 22 by fasteners (not shown) which pass through fastener holes 184*c*.

A recess 184*f* (indicated in FIG. 24) between the inboard second flanges 184*a*, 184*b* receives the outboard end 28*c* of the mid spar. Thus the recess 184*f* enables the "wrap-around" geometry of the outboard rib 17.

The outboard rib 18*a* further comprises four vertically-oriented stiffeners: two inboard stiffeners 188*a*, 188*b* shown in FIG. 23 on the inboard side of the web 181 and two outboard stiffeners 187*a*, 187*b* shown in FIG. 24 on the outboard side of the web 181. These stiffeners prevent buckling of the web 181 of the outboard rib 18*a* by the out-of-plane compressive forces 20*b* shown in FIG. 1B.

The outboard stiffener 187*a* is coupled to the web 181 via a stiffener/web junction and coupled to the outboard first and second flanges 182*a*, 186*a* via respective stiffener/flange junctions.

The outboard stiffener 187*b* is coupled to the web 181 via a stiffener/web junction and coupled to the outboard first and second flanges 182*b*, 186*b* via respective stiffener/flange junctions.

Similarly each inboard stiffener 188*a*, 188*b* is coupled to the web 181 via a stiffener/web junction and coupled to the inboard first and second flanges via respective stiffener/flange junctions.

The stiffeners 187*a*, 188*a* on the front side of the outboard rib 18*a* are at the same chordwise position so that the web 181 and the stiffeners 187*a*, 188*a* form a post 189*a* with a cruciform profile. FIG. 25 is a view of the outboard rib 18*a*, partly in section, which clearly shows the cruciform post 189*a*.

Similarly the stiffeners 187*b*, 188*b* on the rear side of the outboard rib 18*a* are at the same chordwise position so that the web 181 and the stiffeners 187*b*, 188*b* form a post 189*b* with a cruciform profile. This cruciform post 189*b* is shown in FIG. 25.

Such cruciform profiles provides efficient and balanced stiffening structures positioned close to the corners of the mid-spar 28.

In an alternative embodiment, the stiffeners 187*b*, 188*b* on the rear side of the outboard rib 18*a* may be offset so they are not at the same chordwise position. This provides a less balanced profile than the cruciform post 189*b* but may be beneficial in other embodiments.

Similarly, the stiffeners 187*a*, 188*a* on the front side of the outboard rib 18*a* may be offset so they are not at the same chordwise position. This provides a less balanced profile than the cruciform post 189*a* but may be beneficial in other embodiments.

As shown in FIG. 19, when viewed in plan (for instance in a viewing direction at right angles to the upper cover 20 or at right angles to the lower cover 22), the outboard rib 18*a* wraps around both the forward and rear sides of the outboard end 28*c* of the mid spar.

More specifically, the outboard rib 18 comprises a first part (the web 181, the outboard flanges 182*a* 182*b*, 186*a*, 186*b* and the outboard stiffeners 187*a*, 187*b*) positioned outboard of the outboard end 28*a* of the mid spar, a second part (the inboard flanges 184*a*, 185*a* on the front side of the outboard rib 18*a* and the inboard stiffener 188*a* on the front side of the outboard rib 17) positioned between the mid spar 28 and the front spar 24 and also positioned inboard of the outboard end 28c of the mid spar, and a third part (the inboard flanges 184b, 185b on the rear side of the outboard rib 18a and the inboard stiffener 188b on the rear side of the outboard rib 18a) positioned between the mid spar 28 and the rear spar 26 and also positioned inboard of the outboard end 28c of the mid spar.

The mid spar 28 stops short of the web 181 of the outboard rib without passing through the web 181, so the web 181 faces the outboard end 28c of the mid spar.

Beneficially, at least two of the fastener holes 182c and at least of the fastener holes 186c are positioned in line with the outboard end 28c of the mid spar, unlike the other fastener holes which are offset (fore or aft) from the outboard end 28c of the mid spar.

Unlike the inboard rib 17, the outboard rib 18a has no central vertical stiffener in line with the end of the mid spar. This is due to the spatial constraints at the outboard end of the mid spar, and different design requirements.

In the embodiment of FIG. 2, the outboard rib 18 is attached to the front spar 24 by a first cleat 190a, to the rear spar 26 by a second cleat 190b, and to the mid spar 28 by a third cleat 190c. These cleats transfer shear forces from the outboard end of the mid spar 28 into the front and rear spars via the outboard rib 18.

In the embodiment of FIG. 17 on the other hand, the outboard rib 18a is not attached to the mid spar 28, the front spar 24 or the rear spar 26, except via the covers 20, 22. In other words, the cleats 190a-c are omitted in the final assembled winglet.

This reduces parts count and significantly simplifies the assembly processes and procedures.

A significant load concentration occurs in the local connection between the mid spar 28 and the covers 20, 22 which, in turn, results in a complex prying action occurring within the mid spar caps 29a, 29b, 30a, 30b. This loading action in combination with the torque reaction of the cells within the structural cross-section can lead to a significant bending action occurring within the radius of the corners of the mid spar 28, at the junction between the mid spar caps 29a, 29b, 30a, 30b and the mid spar web 39. This mode of failure is often referred to as the corner unfolding/folding mode, which can be critical for composite materials. The prying action can also be critical for co-infused, and/or co-cured, composite joints, such as the connections between spar caps and cover panels, as this introduces a peeling action into the interface between the two connected structural elements, again, possibly introducing an additional unwelcome performance limitation into the overall design, which could lead to the need for increased local material thicknesses for all of the structural elements involved. This is particularly unwelcome within the context of integrated manufacturing techniques, such as Resin Transfer Moulding (RTM) as this builds complexity into the tooling requirements, and potential increases in the costs of the tool design.

These problems are mitigated by the ribs 17, 18, 18a, which provide efficient shear paths to provide a link between the ends 28b, 28c of the mid spar 28 and the front and rear spars 24, 26.

The close coupling of the ribs 17, 18, 18a to the mid spar, in the manner of a wrap-around, provides the ends 28b, 28c of the mid spar 28 with support over a distance back along the mid spar 28 and away from the actual end 28b, 28c of the mid spar. In turn, this provides the corners of the mid spar 28 and its attached caps, as mentioned above, with a far less abrupt loading scenario and gentler load transfer gradient.

This additional support, together with the close coupling of the rib 17, 18, 18a, minimises the edge effects associated with each of the main attachment interfaces and much improves the prying action within both the mid spar 28 and the rib 17, 18, 18a.

As a result the corner unfolding/folding mode of failure is much improved, and the pull-through mode of failure at the interface between the caps of the mid spar 28 and the covers 20, 22 is also improved, making the plain strength mode of failure more balanced in terms of the shear and tension interaction.

In the embodiments above, the ribs 17, 18, 18a each wrap around a respective end of the mid spar 28 without contacting the mid spar 28. However the ribs 17, 18, 18a are positioned close to the mid spar for efficient load transfer.

In the embodiments above, the winglet is a winglet for a fixed wing of a fixed wing aircraft 1. In other embodiments, the winglet may be a winglet for a rotary wing of a rotary wing aircraft.

In the embodiments above, the winglet comprises first and second covers 20, 22, a front spar 24, a rear spar 26, and a mid spar 28 between the front spar and the rear spar; and the mid spar has an I-shaped cross-section comprising a mid spar web, a first pair of mid spar caps joining the mid spar to the first cover, and a second pair of mid spar caps joining the mid spar to the second cover. In other embodiments, the front spar and/or the rear spar may be omitted so the spar with the I-shaped cross-section is not a mid spar.

Figure 13:
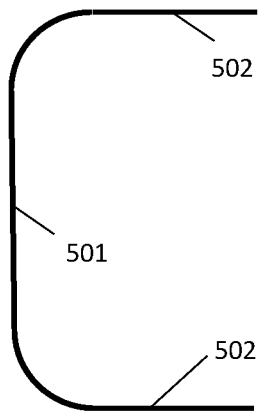
FIG. 13 shows a spar with a C-shaped cross-section.
Figure 14:
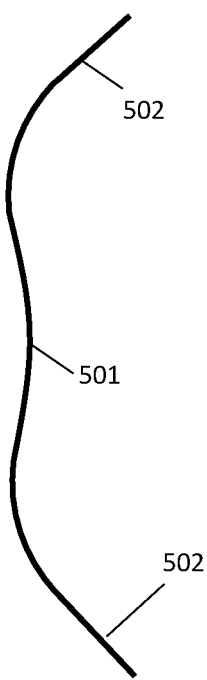
FIG. 14 shows the spar opening up.

In either case, a spar with an I-shaped cross-section has structural advantages compared with conventional winglet spars. For instance, compared with the C-shaped spars in US2019/0329873, an I-shaped cross-section is more symmetrical and more able to resist unbending forces which tend to pull the covers away from the spar. FIG. 13 shows a C-shaped spar with a web 501 and a pair of caps 502. When the spar is subjected to unbending forces, the web 501 bends and the C-shape opens up as shown in FIG. 14. A spar with an I-shaped cross-section will react differently because the caps on either side of the web generate counteracting moments so the web does not bend.

A spar with an I-shaped cross-section also has manufacturing advantages compared with conventional winglet spars. For instance, compared with the tubular braided spar in WO2014/170693, an I-section is easier to manufacture because it does not have a closed shape which makes it easier to remove mandrels or other tooling laterally from the spar.

Although a mid spar 28 with an I-shaped cross-section is preferred for the reasons given above, in other embodiments of the present invention the mid spar 28 may be replaced by an alternative mid spar with a different cross-section—for instance a "box-beam" cross-section.

In the embodiments above, the front spar caps and the rear spar caps are directed inwardly towards the mid spar. This provides a compact arrangement, maximising space for the leading edge structure 23 in front of the front spar and any trailing structure behind the rear spar. In other embodiments, the front spar caps and/or the rear spar caps may be directed away from the mid spar.

In the embodiments above, the winglet cover assembly 100 comprises a cover 20 and a spar 28 formed from fibre-reinforced composite material; and the cover is bonded to the first pair of spar caps 29a, 30a. A spar with an I-shaped cross-section has the advantages mentioned above, and bonding the spar to the cover provides further advantages. For example, it makes manufacturing simpler since it is not necessary to insert fasteners. Also, an I-shaped cross-section is particularly suited to a composite manufacturing process (such as resin transfer moulding) in which mandrels or other tools are provided in the spar. The open shape makes it easy to insert and/or remove such mandrels or other tools laterally from the spar. This is particularly beneficial in the case of a lengthwise curved spar, because it may be difficult or impossible to insert or remove mandrels or other tools from either end of the spar due to its lengthwise curvature.

In the embodiments above, each cover 20, 22 has a length, and each cover 20, 22 curves along all or part of its length—for instance in the transition region 16, 216, 316, 416 or any other part of the winglet with span-wise curvature.

In the embodiments above, the first cover 20 and the mid spar 28 are formed from fibre-reinforced composite material, and the first cover 20 is bonded to the first pair of mid spar caps to form a unitary structure. In other embodiments, both covers and/or the mid spar may be formed from metallic material, and/or both covers 20, 22 may be joined to the mid spar 28 by fasteners.

In the embodiments above, the first cover 20 and the mid spar 28 are formed from fibre-reinforced composite material; the first cover is bonded to the first pair of mid spar caps; and the second cover 22 is joined to the second pair of mid spar caps by fasteners. This arrangement is advantageous because it allows the winglet to be manufactured in two parts which are fastened together in final assembly after any systems (for instance wiring) have been installed.

In the embodiments above, each spar 24, 26, 28 is bonded to the first cover 20, and each spar 24, 26, 28 is joined to the second cover 22 by fasteners. This arrangement is particularly advantageous because it allows the spars 24, 26, 28 and first cover 20 to be easily bonded together as a single winglet cover assembly 100. Systems can then be installed before the second cover is attached. Other arrangements are possible: for instance the mid spar 28 may be co-cured with the first cover 20, and the other spars 24, 26 may be co-cured with the second cover 22.

In the embodiments above, the winglet cover assembly 100 comprises the upper cover 20. In alternative embodiments the lower cover 22 may be co-cured with the spars 24, 26, 28 to form a unitary structure, instead of the upper cover 20.

In the embodiments above, the first cover 20 is co-cured to the first pair of mid spar caps and the second cover 22 is joined to the second pair of mid spar caps 29b, 30b by fasteners. In an alternative embodiment, the second cover 22 may also be co-infused with the cover assembly 100, so that the first cover 20 is co-cured to the first pair of mid spar caps and the second cover 22 is co-cured to the second pair of mid spar caps 29b, 30b. This is less preferred since it makes the removal of the mandrels more difficult.

In the embodiments above, the first cover 20 and the front and rear spars 24, 26 are formed from fibre-reinforced composite material, and the first cover 20 is bonded to the first front spar cap and the first rear spar cap. In other embodiments the first cover 20 and/or the front and rear spars 24, 26 may be formed from metallic material, and joined together by fasteners.

In the embodiments above, the winglet cover assembly 100 comprises a mid spar 28, a front spar 24 and a rear spar 26, all of which are bonded to the cover (for instance by co-curing). In other embodiments the winglet cover assembly may consist only of a cover and a co-cured mid spar, and the front and rear spars may be joined to both covers by fasteners.

In the embodiments above, the spar mandrels 160, 161 are removed after the cover 20 has been bonded to the spars. The spar mandrels 160, 161 may be removed lengthwise from an end of their respective spar, but more preferably they are removed laterally from a side of their respective spar. In other embodiments, the spar mandrels 160, 161 may not be removed, or they may be removed by other means (for instance by dissolving or melting).

In the embodiments above, the cover 20, mid spar 28, front spar 24 and rear spar 26 are provided by co-infusing dry-fibre preforms with a matrix material; and the cover 20 is bonded to the first pair of mid spar caps, the first front spar cap and the first rear spar cap by co-curing the matrix material. In other embodiments, the cover may be bonded to the first pair of mid spar caps, the first front spar cap and the first rear spar cap by some other bonding or co-curing process. For instance the cover the mid spar, the front spar and/or the rear spar may be provided as pre-impregnated fibre-reinforced composite material (prepregs), and the prepregs bonded together by co-curing or co-bonding.

In the embodiments above, the mid spar 28 is provided as a pair of back-to-back parts, and the pair of back-to-back parts are bonded to each other (for instance by co-curing) as the cover 20 is bonded to the first pair of mid spar caps. In other embodiments, the mid spar 28 may be provided as a continuous I-section piece (for instance a single piece of milled or cast metal).

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A winglet comprising first and second covers, a front spar, a rear spar, a rib, and a mid spar between the front spar and the rear spar; wherein:
   the rib and each spar are joined to the first cover and to the second cover;
   the mid spar has a length and the mid spar curves along all or part of its length;
   the length of the mid spar extends from a terminal inboard end of the mid spar to a terminal outboard end of the mid spar; and
   the rib wraps around the terminal inboard or the terminal outboard end of the mid spar or the rib comprises a recess bounding the inboard or outboard end of the mid spar; and
   wherein the rib comprises a web, a first flange joined to the first cover, and a second flange joined to the second cover; and,
   wherein the web is in a facing relation to the terminal inboard or the terminal outboard end of the mid spar, and wherein the mid spar does not extend through the web.

2. The winglet according to claim 1, wherein the rib is not attached to the mid spar, except via the covers.

3. The winglet according to claim 1, wherein the rib is not attached to the front spar, except via the covers; and the rib is not attached to the rear spar, except via the covers.

4. The winglet according to claim 1, wherein the rib comprises an inboard rib which wraps around the inboard end of the mid spar.

5. The winglet according to claim 4, wherein the inboard rib comprises: a first part positioned inboard of the inboard end of the mid spar; a second part positioned between the mid spar and the front spar and also positioned outboard of the inboard end of the mid spar; and a third part positioned between the mid spar and the rear spar and also positioned outboard of the inboard end of the mid spar.

6. The winglet according to claim 5, wherein the second part of the inboard rib comprises a first flange joined to the first cover and a second flange joined to the second cover; and the third part of the inboard rib comprises a first flange joined to the first cover and a second flange joined to the second cover.

7. The winglet according to claim 5, wherein the first part of the inboard rib comprises a first flange joined to the first cover and a second flange joined to the second cover.

8. The winglet according to claim 1, wherein the rib comprises an outboard rib which wraps around the outboard end of the mid spar.

9. The winglet according to claim 8, wherein the outboard rib comprises a first part positioned outboard of the outboard end of the mid spar, a second part positioned between the mid spar and the front spar and also positioned inboard of the outboard end of the mid spar, and a third part positioned between the mid spar and the rear spar and also positioned inboard of the outboard end of the mid spar.

10. The winglet according to claim 9, wherein the second part of the outboard rib comprises a first flange joined to the first cover and a second flange joined to the second cover; and the third part of the outboard rib comprises a first flange joined to the first cover and a second flange joined to the second cover.

11. The winglet according to claim 9, wherein the first part of the outboard rib comprises a first flange joined to the first cover and a second flange joined to the second cover.

12. The winglet according to claim 8, wherein the outboard rib comprises: a web; an inboard first flange which extends on an inboard side of the web and is joined to the first cover; an outboard first flange which extends on an outboard side of the web and is joined to the first cover; a cut-out in the outboard first flange; an inboard second flange which extends on the inboard side of the web and is joined to the second cover; an outboard second flange which extends on the outboard side of the web and is joined to the second cover; and a cut-out in the outboard second flange.

13. The winglet according to claim 1, wherein the rib comprises: a web; a first flange joined to the first cover; and a second flange joined to the second cover.

14. The winglet according to claim 13, wherein the rib further comprises one or more stiffeners, and each stiffener is coupled to the web and the first and second flanges.

15. The winglet according to claim 14, wherein the rib comprises an inboard rib which wraps around the inboard end of the mid spar, and the one or more stiffeners are positioned in line with the inboard end of the mid spar.

16. The winglet according to claim 1, wherein the rib comprises: a web; an inboard first flange which extends on an inboard side of the web and is joined to the first cover; an outboard first flange which extends on an outboard side of the web and is joined to the first cover; an inboard first flange which extends on the inboard side of the web and is joined to the first cover; and an outboard second flange which extends on the outboard side of the web and is joined to the second cover.

17. The winglet according to claim 16, wherein the rib further comprises an inboard stiffener which is coupled to the web, the inboard first flange and the inboard second flange; and an outboard stiffener which is coupled to the web, the outboard first flange and the outboard second flange.

18. The winglet according to claim 17, wherein the web and the stiffeners form a post with a cruciform profile.

19. A winglet comprising first and second covers, a front spar, a rear spar, a rib, and a mid spar between the front spar and the rear spar; wherein:
the rib and each spar are joined to the first cover and to the second cover;
the mid spar has a length and the mid spar curves along all or part of its length;
the length of the mid spar extends from a terminal inboard end of the mid spar to a terminal outboard end of the mid spar;
the rib comprises a recess bounding the terminal inboard or the terminal outboard end of the mid spar;
wherein the rib comprises a web, a first flange joined to the first cover, and a second flange joined to the second cover; and,
wherein the web is in a facing relation to the terminal inboard or the terminal outboard end of the mid spar, and wherein the mid spar does not extend through the web.

20. A winglet cover assembly comprising: a cover, a front spar, a rear spar, a rib, and a mid spar between the front spar and the rear spar; wherein:
the rib and each spar are joined to the cover;
the mid spar has a length and the mid spar curves along all or part of its length;
the length of the mid spar extends from an inboard end of the mid spar to an outboard end of the mid spar;
the rib comprises a web, a first flange joined to the first cover, and a second flange joined to the second cover; and
wherein the mid spar comprises a terminal end in a facing relation to and terminating at the web of the rib without extending through the web, so the web faces the inboard or outboard end of the mid spar; and
the rib wraps around the inboard or outboard end of the mid spar, or the rib comprises a recess bounding the inboard or outboard end of the mid spar.

* * * * *